US005107673A

United States Patent [19]

Sato et al.

[11] Patent Number: 5,107,673

[45] Date of Patent: Apr. 28, 1992

[54] METHOD FOR DETECTING COMBUSTION CONDITIONS IN COMBUSTORS

[75] Inventors: Isao Sato; Seiichi Kirikami; Akira Shimura; Fumiyuki Hirose; Hiroshi Inose; Haruo Urushidani; Osamu Arai, all of Hitachi, Japan

[73] Assignee: Hitachi, Ltd., Tokyo, Japan

[21] Appl. No.: 693,612

[22] Filed: Apr. 30, 1991

Related U.S. Application Data

[62] Division of Ser. No. 389,746, Aug. 4, 1989, Pat. No. 5,024,055.

[30] Foreign Application Priority Data

Aug. 9, 1988 [JP] Japan .............................. 63-198622

[51] Int. Cl.[5] .............................. F02C 9/16; F02C 9/28

[52] U.S. Cl. .............................. 60/39.02

[58] Field of Search .............................. 60/39.24, 39.27, 39.281, 60/39.29, 39.33, 39.5, 39.02; 431/76

[56] References Cited

U.S. PATENT DOCUMENTS 4,731,990 3/1988 Munk .............................. 431/76

FOREIGN PATENT DOCUMENTS 9911 1/1978 Japan .............................. 60/39.5

41524 3/1982 Japan .

197726 9/1986 Japan .............................. 60/39.281

*Primary Examiner*—Louis J. Casaregola

*Attorney, Agent, or Firm*—Antonelli, Terry, Stout & Kraus

[57] ABSTRACT

A method for detecting combustion conditions in a plurality of combustors in a gas-turbine apparatus which includes the combustors and a gas turbine driven by combustion gas from the combustors, comprises a step for measuring concentration of unburnt component in the combustion gas by means of a plurality of sensors disposed on the downstream side of the gas turbine, a step for obtaining a distribution pattern of the measured concentration, and a step for investigating the distribution pattern to detect combustion conditions in the combustors.

9 Claims, 5 Drawing Sheets

METHOD FOR DETECTING COMBUSTION CONDITIONS IN COMBUSTORS

This application is a division of application Ser. No. 389,746, filed Aug. 4, 1989, (U.S. Pat. No. 5,024,055).

FIELD OF THE INVENTION AND RELATED ART STATEMENT

The present invention relates to a therefor for detecting combustion conditions in combustors in a gas-turbine apparatus.

Combustion conditions of fuel in combustors have an important effect upon a gas-turbine apparatus. For example, misfire or flameout in the combustors incurs reductions in the combustion efficiency and in the output power of the gas-turbine apparatus. Further, the temperature of combustion gas is reduced to thereby induce a high thermal stress in the combustors, a transition duct and a turbine. These instruments may be in danger of being damaged. In addition, reduction in the temperature of combustion gas promotes the generation of nitrogen oxides (NOx).

It is important to know the combustion conditions in the combustors. For this reason, it has been a common practice to presume the combustion conditions in the combustors on the basis of the temperature of combustion gas from the combustor detected by a temperature sensor. However, if the sensor of this kind is disposed between the combustor and a gas turbine arranged on the downstream side of the combustor, a portion of the sensor which projects into a combustion gas passage will disturb the flow of combustion gas to thereby incur a loss of energy to be supplied to the gas turbine. Accordingly, the temperature sensor has been arranged on the downstream side of the gas turbine.

However, if a flameout occurs in one or two of plural combustors, the degree of change in temperature is low. Consequently, if the temperature sensor is disposed on the downstream side of the gas turbine, it is difficult to detect the flameout and, particularly, to specify the combustor in which the flameout has occurred. Further, in case of using a plurality of multistage combustors each having a first stage combustion chamber and a second stage combustion chamber disposed downstream of the first stage combustion chamber, it is particularly difficult to detect the flameout and to specify the combustor.

OBJECT AND SUMMARY OF THE INVENTION

Accordingly, an object of the present invention is to provide a detection device, according to which combustion conditions in combustors, even in multistage combustors, incorporated in a gas-turbine apparatus can be certainly detected so that abnormal combustion in the combustors can be exactly detected and defective combustors can be specified.

To this end, according to the present invention, in place of the temperature sensor, a plurality of sensors capable of measuring the concentration of unburnt component in combustion gas are arranged on the downstream side of a gas turbine, so that conditions in combustors are known from a distribution pattern of measured concentration of the unburnt component.

This arrangement makes is possible to detect not only the abnormal combustion in the single stage combustors but also the abnormal combustion in the multistage combustors, which has been hardly detected by the temperature sensor.

Functions and effects of the present invention will become more clear from the following description of preferred embodiment described with reference to the accompanying drawings.

DETAILED DESCRIPTION OF PREFERRED EMBODIMENT

Figure 1:
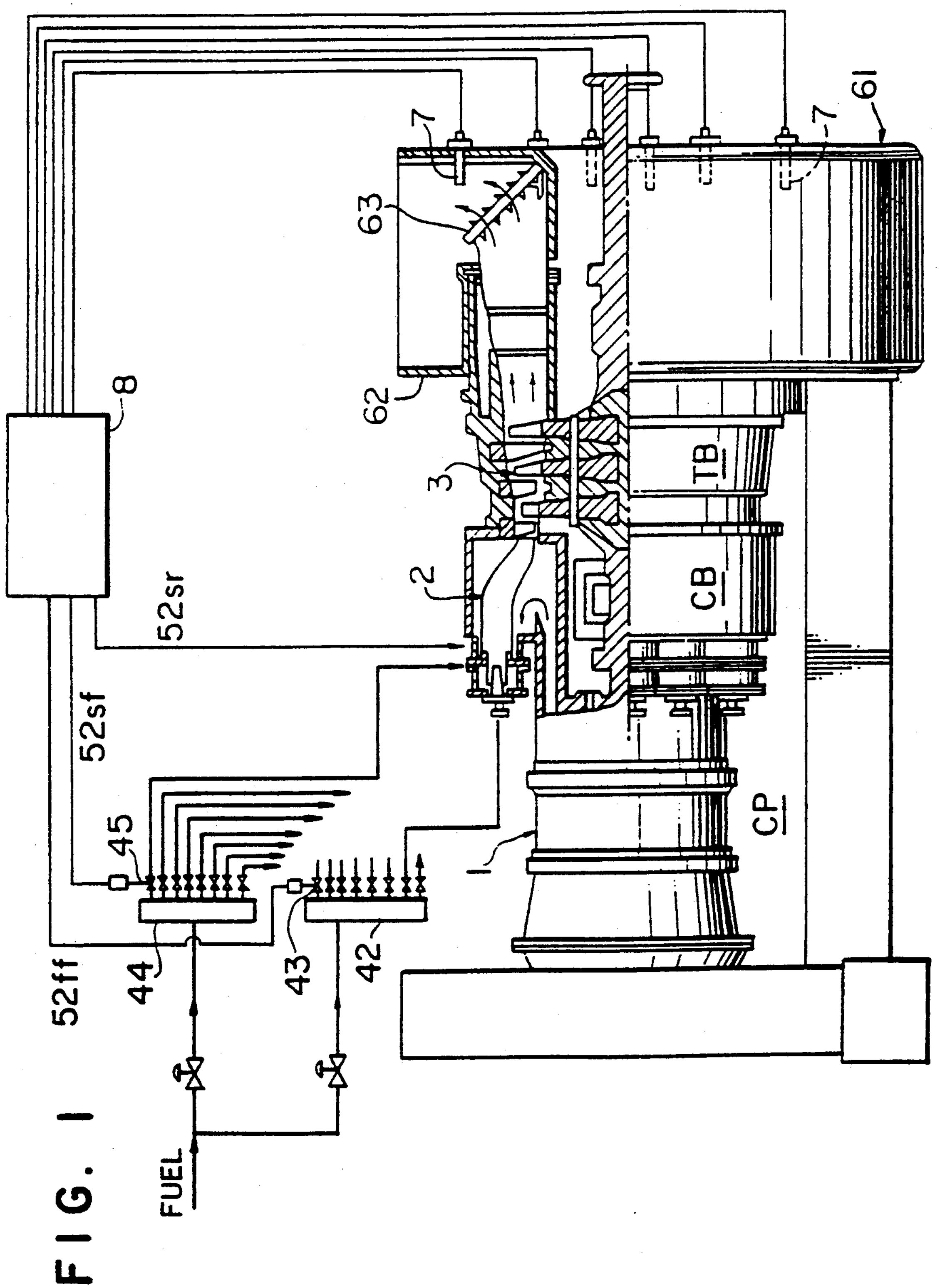
FIG. 1 is a view showing an arrangement of a gas-turbine apparatus to which an embodiment of the present invention is applied.

Referring to FIG. 1, the gas-turbine apparatus comprises a compressor section CP provided with a compressor generally designated by the reference numeral 1, a combustion section CB provided with eight two-stage combustors generally designated by the reference numeral 2 which are disposed on the same circle, and a turbine section TB provided with a gas-turbine generally designated by the reference numeral 3.

Figure 2:
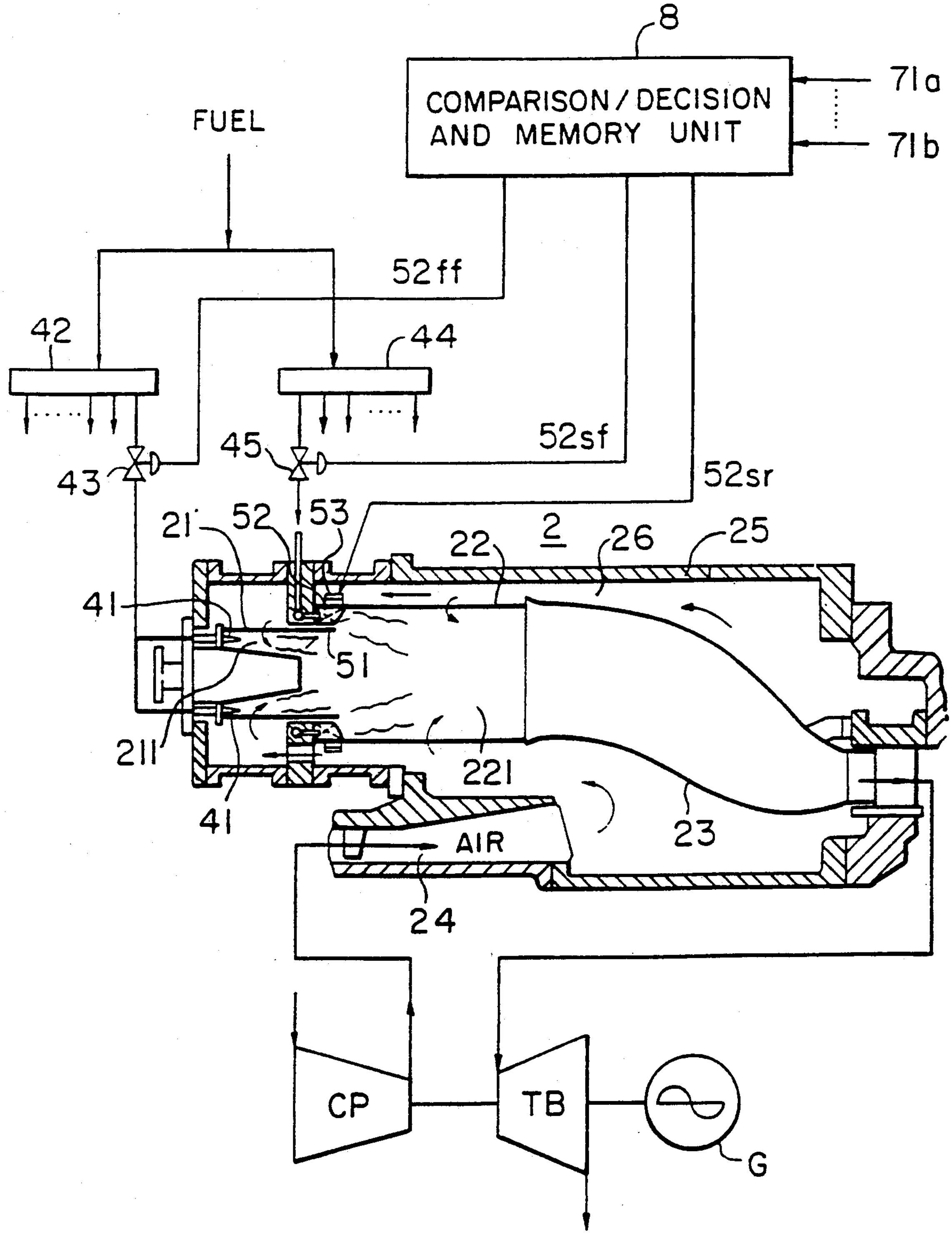
FIG. 2 is a sectional view showing a combustor of the gas-turbine apparatus shown in FIG. 1.

Referring to FIG. 2, each combustor 2 includes a liner 21 defining a first stage combustion chamber 211, a main cylinder 22 defining a second stage combustion chamber 221 communicated with the first stage combustion chamber 211 and disposed on the downstream side thereof, and a transition duct 23 connected to the main cylinder 22 and through which combustion gas flows toward the gas turbine 3.

As the compressor 1 operates, high pressure air from the compressor 1 flows toward each combustor 2. The high-pressure air flows through an air induction passage 24 and an air flow passage 26 defined by a casing 25 of the combustor and the main cylinder 22 and the transition duct 23, and flows into the first stage combustion chamber 211 through a large number of openings formed in the liner 21. Fuel flows through a first manifold 42 and the respective fuel passages each provided with a flow control valve 43, and is injected into the first stage combustion chamber 211 of each combustor through a plurality of fuel nozzles 41 projecting into the first stage combustion chamber 211. Then, the fuel is ignited by an igniter (not shown) to form a primary flame.

Moreover, a portion of the high-pressure air from the compressor 1 flows into each second stage combustion chamber 221 through a large number of openings formed in the main cylinder 22, while another portion of the same flows into a swirler 51 through an air flow controlling portion 52 the opening degree of which is changed by means of a slide ring 53. The fuel also flows through a second manifold 44 and the respective fuel passages each provided with a flow control valve 45, and is injected into the swirler 51 of each combustor, where the fuel is mixed with the injected air to become a pre-mixture. The pre-mixture blown out from the swirler 51 to the second stage combustion chamber 221 is ignited by the primary flame to form a main flame.

Figure 4A:
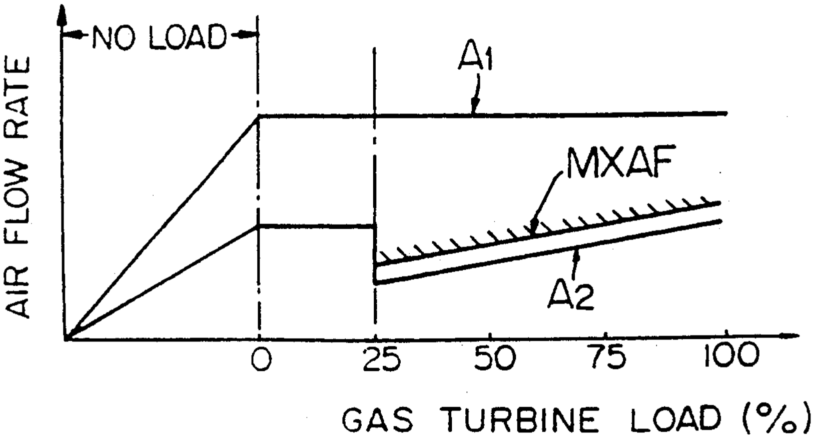
FIG. 4A is a graphical illustration of a flow rate of air supplied to a combustor relative to a gas turbine load.
Figure 4B:
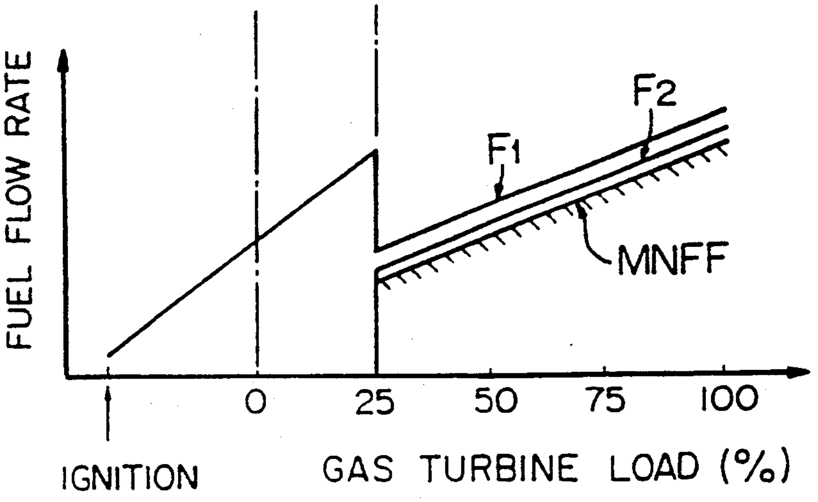
FIG. 4B is a graphical illustration of a flow rate of fuel supplied to a combustor relative to a load of the gas turbine.

As shown in FIGS. 4A and 4B, a flow rate $A_1$ of air to be supplied to the first stage combustion chamber 211 increases as the number of revolutions of the gas turbine increases. After the number of revolutions of the gas turbine reaches the rated rotational speed, that is, as the load of the gas turbine increases, the air flow rate $A_1$ becomes steady. In addition, a flow rate $F_1$ of fuel to be supplied to the first stage combustion chamber 211 also increases as the load of the gas turbine increases. The fuel flow rate $F_1$ is once reduced by a predetermined amount when the load of the gas turbine reaches 25% of its rated load. At this time, fuel is simultaneously supplied to the second combustion chamber 221 at a flow rate $F_2$ which is equal to the reduced predetermined amount. Thereafter, as the load of the gas turbine increases, the fuel flow rates $F_1$ and $F_2$ increase. A flow rate $A_2$ of air to be supplied to the second combustion chamber 221 increases in response to the increase in the fuel flow rate $F_2$ (as shown in FIG. 4B), thus forming the pre-mixture.

Combustion gas from each combustor 2 passes through the transition duct 23 and, then, passes through the gas turbine 3 provided with stator blades and rotor blades to provide it with work. This work is converted into electrical energy by means of a generator G a rotary shaft of which is connected to a rotary shaft of the gas turbine 3.

As shown in FIG. 1, combustion gas from the gas turbine 3 flows through an interior of a combustion gas chamber casing 61 in an axial direction and, then, passes through a flow straightener 63 so as to flow in a duct 62 in a direction perpendicular to the axial direction. The combustion gas from the duct 62 is released to the atmosphere or, in case of a compound plant equipped with both steam turbine and gas turbine, is introduced to an exhaust heat recover boiler.

Figure 6:
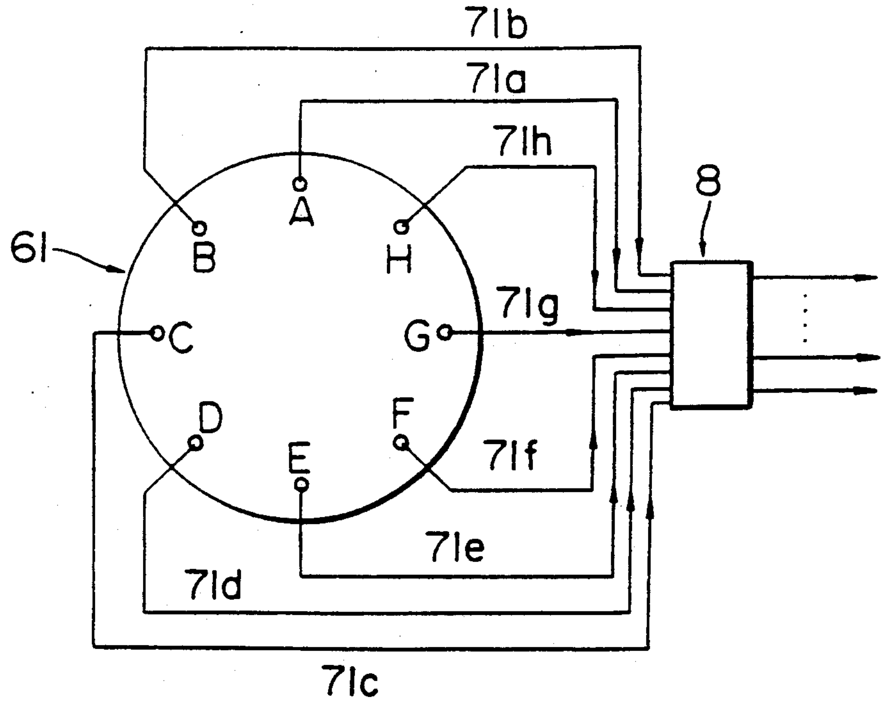
FIG. 6 is a view showing the arrangement of concentration measuring sensors.

Sensors 7 for measuring the concentration of unburnt component in the combustion gas, e.g., the concentration of unburnt hydrocarbon UHC, are disposed at eight measuring points (A–H) on an end wall of the combustion gas chamber casing 61, which are arranged equiangularly on the same circle, as apparent from FIGS. 1 and 6. At each measuring point where the sensor 7 is disposed as described above, the flow of combustion gas is bent to increase the velocity thereof. It is more preferable to measure the concentration at these measuring points.

Figure 3:
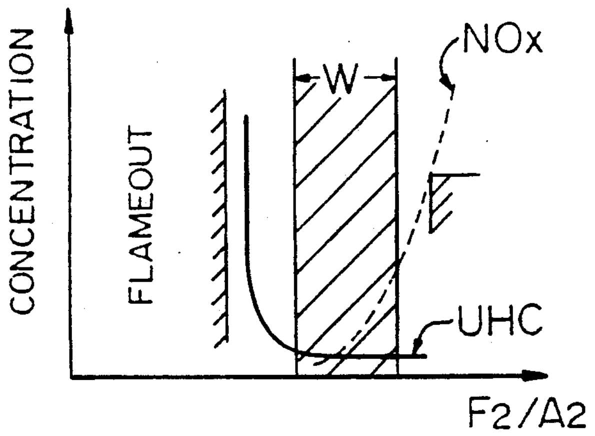
FIG. 3 is a graph showing the combustion characteristics of the combustor shown in FIG. 2.

In each combustor 2, if the flow rate $A_2$ of air to be supplied to the second stage combustion chamber 221 is too much, that is, if the air flow rate $A_2$ exceeds the maximum air flow rate MXAF in FIG. 4A, the pre-mixture becomes too lean to blow out the main flame (see FIG. 3). To the contrary, if the flow rate $F_2$ of fuel to be supplied to the second stag combustion chamber 221 is too small, that is, if the fuel flow rate $F_2$ falls short of the minimum fuel flow rate MNFF in FIG. 4B, the pre-mixture becomes too lean to blow out the main flame. If the main flame is blown out, the concentration of unburnt component in the combustion gas increases. For this reason, it is appropriate to control the flow rates $A_2$ and $F_2$ upon detecting the increase of the concentration of unburnt component.

Figure 5:
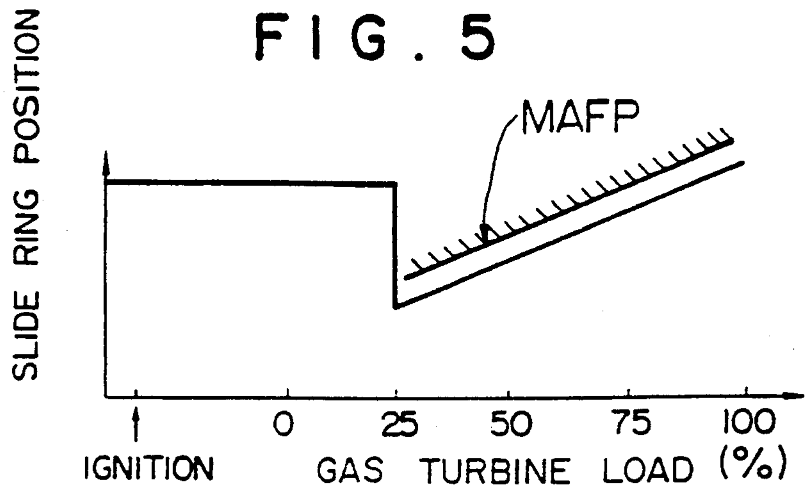
FIG. 5 is a graph showing the position of a slide ring of the combustor relative to the load of the gas turbine.
Figure 7:
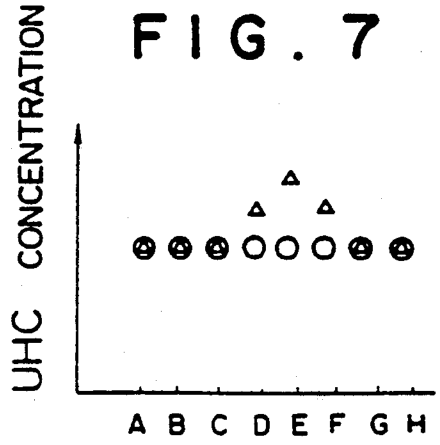
FIG. 7 is a graph showing concentration distribution patterns appearing in normal and in abnormal conditions, respectively.

Therefore, detection signals 51*i* (i=A–H) indicative of the measured concentration from each sensor 7 are read in a comparison/decision and memory unit 8. The comparison/decision and memory unit 8 obtains a pattern of concentration distribution corresponding to the measuring points as shown in FIG. 7, on the basis of the read detection signals. In FIG. 7, a flat pattern expressed with circular marks (o) means that every combustor is operated in normal condition. On the contrary, in case that one or more peaks appear in the pattern as expressed with triangular marks (Δ) in FIG. 7, the comparison decision and memory unit 8 examiner or investigates the obtained distribution pattern and makes a decision that at least one of the combustors is defective and increases the unburnt component. Further, it is possible to know, in advance, as a result of experiments or simulations, that what peak appears for which combustor is defective, which varies in accordance with the load of the gas turbine. Accordingly, in the present embodiment, these results are prestored in the comparison/decision and memory unit 8 as reference patterns, so that the defective combustor or combustors are specified by comparing the pattern of measured concentration distribution with the reference patterns. The comparison/decision and memory unit 8 sends command signals $52_{ff}$, $52_{sf}$ and $52_{sr}$ to the flow control valves 43 and 45 and a driving device which serves to make slide the slide ring 53, respectively, which are associated with the defective combustor. The opening degrees of the flow control valves 43 and 45 and the position of the slide ring 53, which are associated with the defective combustor, are so controlled as to hold an air fuel ratio $F_2/A_2$ in the second stage combustion chamber of the defective combustor within the proper range W shown in FIG. 3. In this way, it is possible to control the flow rates $A_2$ and $F_2$ more suitably. In other words, the fuel flow rate $F_2$ is controlled so as not to fall short of the minimum fuel flow rate MNFF (FIG. 4B), while the air flow rate $A_2$ is controlled so as not to exceed the maximum air flow rate MXAF (FIG. 4B). Control of the air flow rate $A_2$ is effected by changing the opening degree of the air flow controlling portion 52 by sliding the slide ring 53. Namely, the position of the slide ring 53 is controlled so as not to outrun the maximum air flow rate position MAFP (see FIG. 5).

Alternatively, the comparison/decision and memory unit 8 serves to temporarily shut down the gas turbine so as to enable the defective combustor to be inspected and repaired. FIG. 3 shows the relationship between the air fuel ratio in the second stage combustion chamber and the concentrations of nitrogen oxides NOx and unburnt component UHC contained in the combustion gas. By keeping the air fuel ratio in the second stage combustion chamber within the proper range W, the concentrations of nitrogen oxides NOx and unburnt component UH contained in the combustion gas can be respectively kept lower.

Figure 8A:
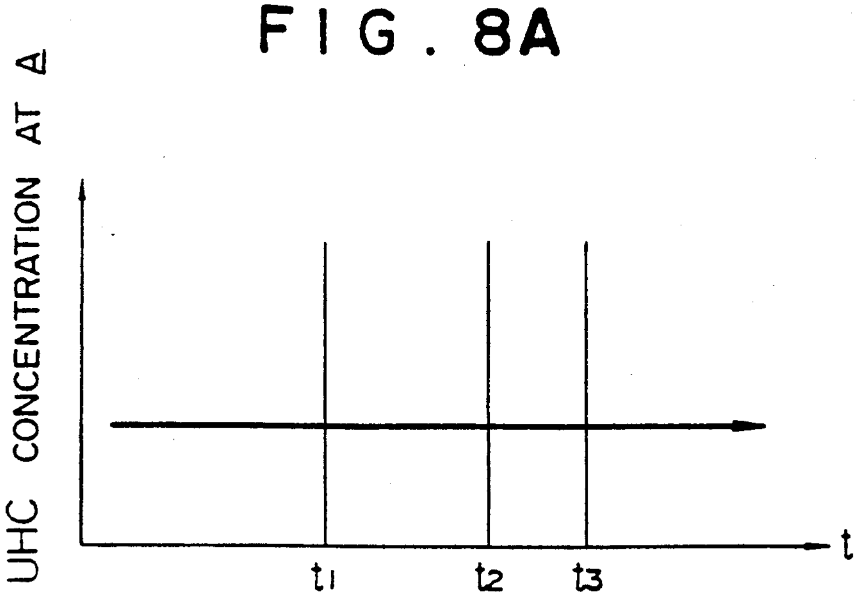
FIGS. 8A–8C are graphical illustrations depicting changes in concentration of an unburnt component over a given period of time.
Figure 8B:
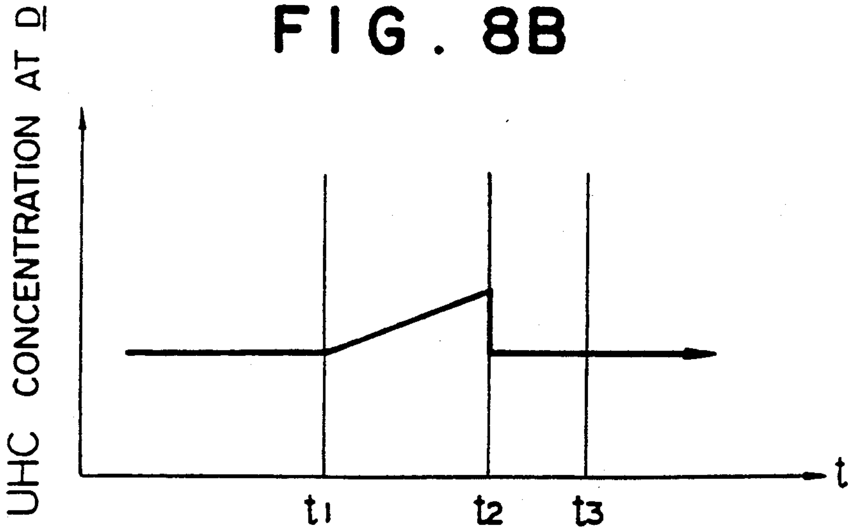
Figure 8C:
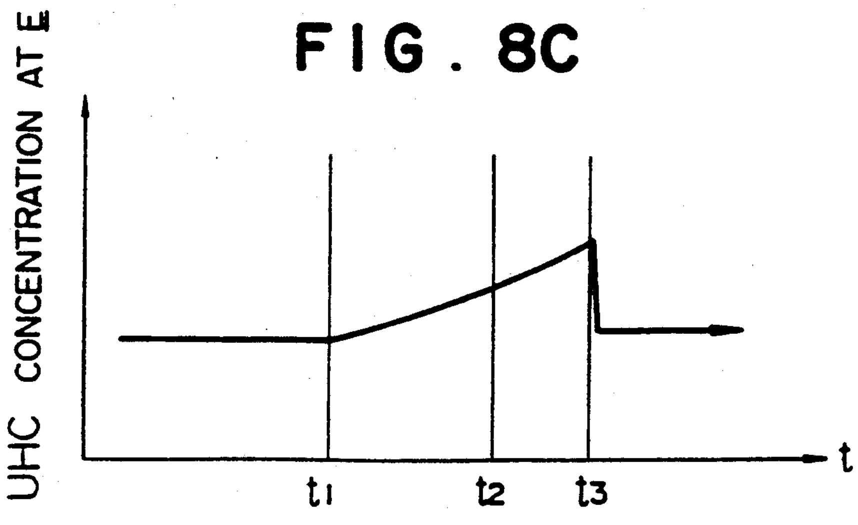

The results of such control will be described in regard to the measuring points A, D and E with reference to FIG. 8.

First, until the time $t_1$, the concentration of unburnt component at every measuring point shows a normal value. Therefore, no combustor is defective. After the time $t_1$, the concentrations of unburnt component UHC at the measuring points D and E increase, which means that some of combustors are defective. The comparison/decision and memory unit 8 appropriately controls the flow control valves 43 and 45 and the slide ring 53 which are associated with the specified defective combustor. As a result, the concentration of unburnt component at the measuring point D is brought back to the normal value by the time $t_2$. Due to further control by the comparison/decision and memory unit 8, the concentration of unburnt component at every measuring point is brought back to the normal value by the time $t_3$. This means that every combustor operates in normal conditions.

As apparent from the above description, the device according to the present invention can be applied not only to the gas-turbine apparatus employing the single stage combustors but also to the gas-turbine apparatus using the multistage combustors the abnormality in which has been hardly detected by the prior arts. Accordingly, it is possible to carry out the control, the repairs and the like before a terrible accident of the gas-turbine apparatus is brought upon.

Furthermore, according to the present invention, it is possible not only to detect that the combustor or combustors of the gas-turbine apparatus are defective but also to specify the defective combustor or combustors. This makes it possible to control and repair the gas-turbine apparatus in a shorter time and at lower costs.

What is claimed is:

1. A method for detecting combustion conditions in a plurality of combustors in a gas-turbine apparatus which includes a gas turbine driven by combustion gas from said combustors, said method comprising the steps of:

measuring a concentration of at least one uncombusted component in said combustion gas by a plurality of sensors disposed on a downstream side of said gas turbine;

obtaining a distribution pattern of said measured concentration; and examining said distribution pattern to detect combustion conditions in said combustors.

2. A detecting method according to claim 1, wherein said steps are repeated over a predetermined time period.

3. A detecting method according to claim 1, wherein the step of measuring includes measuring the combustion gas at a position at which the combustion gas from the combustors flows at an increased speed.

4. A detecting method according to claim 1, wherein the step of examining includes storing the distribution pattern in a memory means, and comparing said distribution pattern with distribution patterns prestored in said memory means.

5. A control method for controlling combustion in a plurality of combustors in a gas-turbine apparatus which includes a gas turbine driven by combustion gas from said combustors, said method comprising the steps of:

measuring a concentration of at least one uncombusted component in said combustion gas by a plurality of sensors disposed on a downstream side of said gas turbine;

obtaining a distribution pattern of said measured concentration;

examining said distribution pattern to detect combustion conditions in said combustors; and adjusting flow rates of air and/or fuel to be fed to the respective combustors in dependence upon detected combustion conditions.

6. A control method for controlling combustion according to claim 5, wherein each of said combustors includes a first stage combustion chamber and a second stage combustion chamber disposed downstream of said first stage combustion chamber, and wherein the step of adjusting includes adjusting flow rates of air and/or fuel fed to the respective second stage combustion chambers.

7. A control method for controlling combustion according to claim 6, wherein the step of examining includes storing the distribution pattern in a memory means, and comparing said distribution pattern with distribution patterns prestored in said memory means.

8. A control method for controlling combustion according to claim 5, wherein the step of measuring includes measuring the combustion gas at a position at which the combustion gas from the combustors flows at an increased speed.

9. A control method for controlling combustion according to claim 5, wherein the step of examining includes storing the distribution pattern in a memory means, and comparing said distribution pattern with distribution patterns prestored in said memory means.

* * * * *